Figure 1:
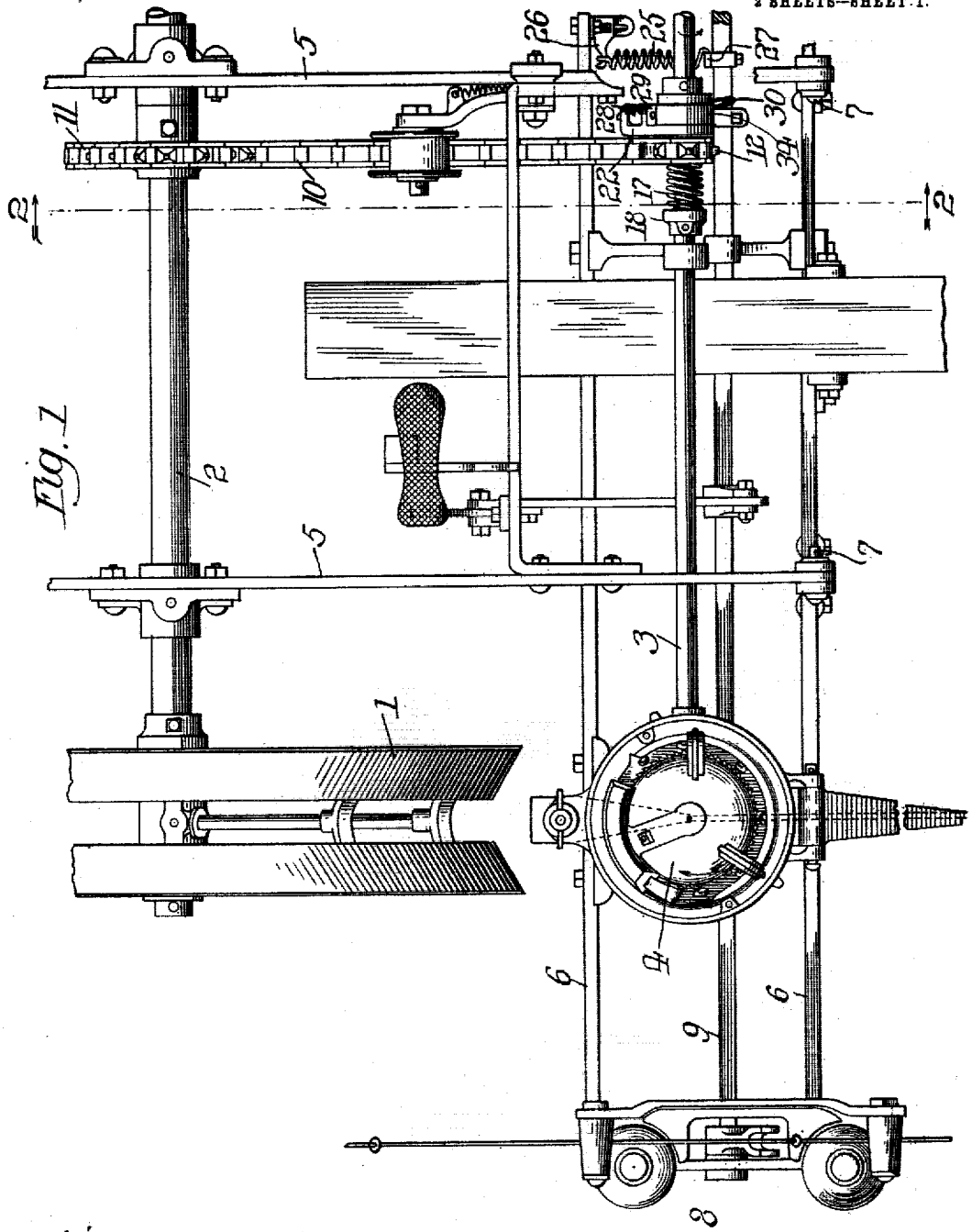

No. 825,542. PATENTED JULY 10, 1906.
W. F. JACOBS.
CLUTCH MECHANISM.
APPLICATION FILED OCT. 6, 1905.

2 SHEETS—SHEET 1.

Witnesses:
Inventor:
William F. Jacobs
by Thos. F. Brown
his Attys

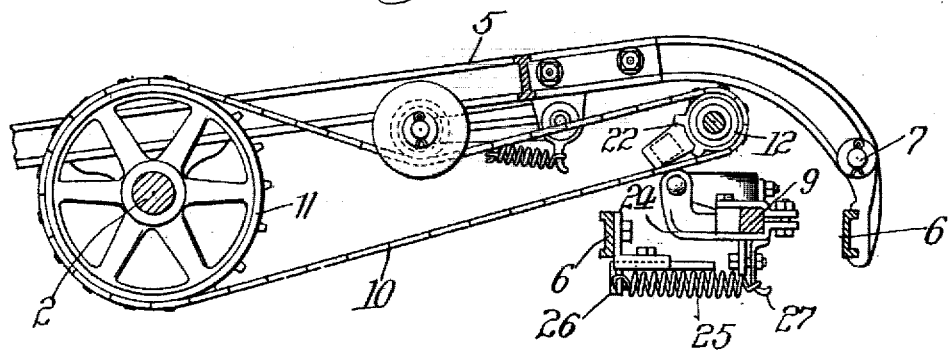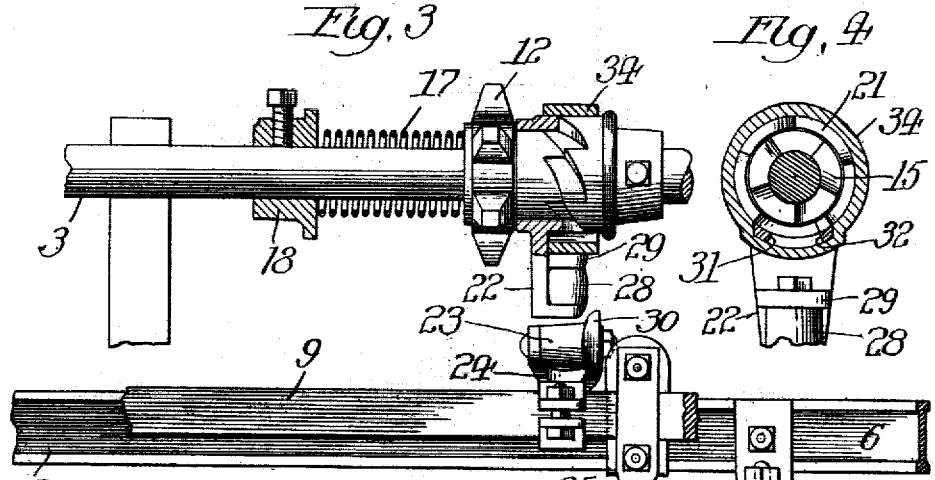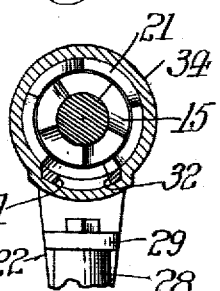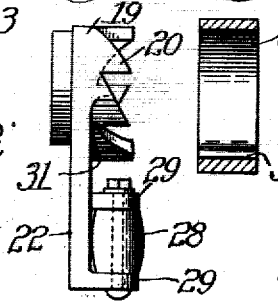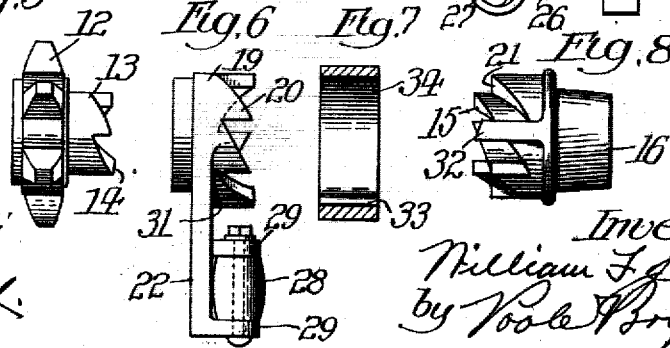

UNITED STATES PATENT OFFICE.

WILLIAM F. JACOBS, OF OTTAWA, ILLINOIS.

CLUTCH MECHANISM.

No. 825,542.   Specification of Letters Patent.   Patented July 10, 1906.

Application filed October 6, 1905. Serial No. 281,658.

*To all whom it may concern:*

Be it known that I, WILLIAM F. JACOBS, a citizen of the United States, residing at Ottawa, in the county of Lasalle and State of Illinois, have invented certain new and useful Improvements in Clutch Mechanism; and I do hereby declare that the following is a full, clear, and exact description thereof, reference being had to the accompanying drawings, and to the numerals of reference marked thereon, which form a part of this specification.

This invention relates to improvements in clutches for intermittently connecting a continuously-rotative driving-shaft with a shaft which is to be driven intermittently and constructed to disconnect the driven shaft from the driving-shaft at other times.

The mechanism herein shown has been designed especially for intermittently rotating the seed-shaft of a corn-planter from the cover-wheel axle or other continuously-rotating part of the planter in such manner that the seed-shaft is driven at regular intervals, between which intervals it remains stationary. Such use of my improved clutch is fully illustrated in my pending application for United States Letters Patent, Serial No. 262,212, filed May 25, 1905.

The invention consists in the matters hereinafter set forth, and more particularly pointed out in the appended claims.

As shown in the drawings, Figure 1 is a partial plan view of a corn-planter provided with my improved clutch mechanism for intermittently rotating the seed-shaft from the main axle. Fig. 2 is a vertical section taken on line 2 2 of Fig. 1. Fig. 3 is an enlarged detail of the main operative parts of the clutch. Fig. 4 is a face view of one of the clutch members and a portion of the cam operating to separate the clutch members. Figs. 5, 6, 7, and 8 are details of the component parts of the clutch mechanism.

As shown in the drawings, 1 designates one of the cover-wheels of the planter, 2 the axle thereof, and 3 the seed-shaft driven from the axle and operatively connected with the seed-plate at the bottom of the seedbox, (designated as a whole by 4,) as more clearly shown in my aforesaid application.

5 5 designate the side members of the main frame, and 6 6 the front and rear members of the runner and seedbox-supporting frame, to the forward member of which the forward end of the main frame members 5 are pivoted by pivot-pins 7. The runner and seedbox-frame supports outside the seedboxes the usual check-row attachments, (designated as a whole by 8,) which latter operates in a familiar manner the rocking check-row shaft 9. The said check-row shaft carries a part to be more fully hereinafter described, which operates to control the action of the clutch mechanism.

The seed-shaft 3 is rotated from the axle 2 through the medium of a sprocket-belt 10, trained about a sprocket-wheel 11, or the axle and a sprocket-pinion 12 on the seed-shaft. The sprocket-wheel 12 is attached to or made part of a sleeve 13, which is capable of rotating and sliding endwise on the seed-shaft 3 and constitutes one member of the clutch. The sleeve 13 is provided at its inner end with a series of ratchet-shaped clutch-teeth 14, concentric with the axis of the seed-shaft, adapted to engage like clutch-teeth 15 on a sleeve 16, which is fixed concentrically to said seed-shaft. The sleeve 13, which slides longitudinally of the seed-shaft 3, as aforesaid, is normally forced toward the sleeve 16 in a manner to bring the clutch-teeth 14 and 15 into engagement by means of a spiral expansive spring 17, surrounding the seed-shaft and interposed between the sleeve 13 and a collar 18, fixed to the seed-shaft in any suitable manner.

Surrounding the sleeve 13 is a cam-sleeve 19, provided with cam projections 20, one face of each of which is oblique to the axis of the sleeve and the other parallel with said axis, and said cam projections engage similarly-shaped cam projections 21, carried by the sleeve 16 and surrounding the clutch-teeth 15 of said sleeve 16. As herein shown, the cam projections encircle the clutch-teeth, but a less number of such cam projections may be provided, if desired. The cam projections are inclined in the same manner as are the clutch-teeth, and when, therefore, the ring 19 and sleeve 16 are rotated relatively to each other the inclined cam projections act to force the sleeve 19 away from the sleeve 16 against the action of the spring 17, and thereby separate the clutch members and disconnect the shaft 3 from the driving power. The cam projections of the sleeves 19 and 16 are so disposed relatively to the clutch-teeth that the cam projections are not freed from each other when the clutch-teeth are separated or clear of each other, so that the cam projections on the sleeve 19 do not slip past their companion projections. The shaft 3 in the organization shown rotates once for each intermittent rotary movement of the seed-plates, and the clutch members are actuated to disconnect the shaft 3 from the axle at the termination of each rotation of the seed-shaft by a tripping device carried by the check-row-actuated rock-shaft 9. Said clutch-tripping mechanism is made as follows: The cam-ring 19 is provided with a radial arm 22, which rotates in a path normally occupied by a tripping-arm 23, carried by a bracket 24, which is fixed to and extends rearwardly from the rock-shaft 9. The said tripping-arm 23 stands in the path of the arm 22 except at such times as when the shaft 9 is rocked backwardly by the check-row mechanism, and at this time the tripping-arm is swung below the path of the cam-actuating arm. When the cam-actuating arm 22 during its rotary movement strikes the tripping-arm 23 the rotation of the clutch-sleeve 19 is arrested, and owing to the continued rotation of the sleeve 16 and its shaft 3 the cam projections operate to back the sleeve 19 away from the sleeve 16 until the clutch-teeth are separated, at which time the shaft 3 discontinues its rotation, while the sleeve 13 rotates loosely thereon. When applied to a corn-planter, as herein shown, the arrest of the shaft 3 also arrests the rotation of the seed-plate geared thereto. The parts are held in this position until the rock-shaft 9 is again rocked rearwardly, whereupon the tripping-arm is swung out of the path of the cam-actuating arm 22, and the spring 17 acts to force the clutch elements into engagement to again transmit rotation of the axle or driving-shaft to the driven or seed shaft 3, which latter rotates continuously until the cam-actuating arm again strikes the tripping-arm.

The rock-shaft 9 is held in its normal position, when free from the action of the check-row mechanism, by means of a spring 25, attached at one end to an arm 26, mounted on the rearmost member 6 of the seedbox and runner-frame and at its other end to a hook 27, depending from the rock-shaft 9, said spring acting to hold the rock-shaft against a suitable stop (not shown) with the trip-arm 23 thereof in position to engage the actuating-arm 22. In order to avoid jars or shocks between the tripping-arm and the cam-actuating arm, the latter arm carries a roller 28 between lugs 29 29 on said arm, and the tripping-arm 23 is provided on one side with a forwardly-extending cam-shaped member 30, which engages said roller.

In order to prevent the momentum of the parts from disengaging the cam-teeth after the required separation of the clutch-teeth, in case wear of the cam projections should permit such separation, a suitable stop mechanism is employed which consists in the present instance of two ribs 31 32, formed, respectively, on the sleeve 19 and the sleeve 16, and said ribs occupy a recess 33, formed within a ring 34, which loosely encircles the abutting ends of the cam projections. Said ribs 31 and 32 normally occupy the position shown in Fig. 4 at the ends of the recess 33, and when the clutch-sleeve is arrested the ribs 31 32 are brought together by relative rotation of the parts and prevent such movement as will entirely separate the cam projections.

I claim as my invention—

1. In a clutch mechanism, a rotative shaft, two clutch-sleeves, meshing clutch-teeth on the adjacent ends of said sleeves, one sleeve being fixed to the shaft and the other rotative thereon and movable toward and from the fixed sleeve, an actuating-arm for said movable clutch-sleeve, a spring pressing the movable clutch-sleeve into mesh with the fixed sleeve, an annular cam surrounding said clutch-sleeves for separating the same, combined with a tripping-arm that normally stands in the path of said cam-actuating arm, and means for moving said tripping-arm out of the path of said actuating-arm to permit operative engagement of the clutch-sleeves under the action of said spring.

2. In a clutch mechanism, a rotative shaft, two clutch-sleeves, meshing clutch-teeth on the adjacent ends of said sleeves, one sleeve being fixed to the shaft and the other rotative thereon and movable toward and from the fixed sleeve, a spring for pressing the movable clutch-sleeve into mesh with the fixed sleeve, a cam rotative with said clutch-sleeves for spreading said sleeves apart, a cam-actuating arm, a tripping-arm located normally in the path of rotation of the cam-actuating arm and means for moving said tripping-arm out of the path of the cam-actuating arm to permit operative engagement of said clutch-sleeves under the action of said spring.

3. In a clutch mechanism, a rotative shaft, two clutch-sleeves, meshing clutch-teeth on the adjacent ends of said sleeves, one sleeve being fixed to the shaft and the other rotative thereon and movable toward and from the fixed sleeve, an actuating-arm for the movable clutch-sleeve, a gear rotative with the movable clutch-sleeve, a spring for pressing the movable clutch-sleeve into mesh with the fixed sleeve, an annular cam-ring surrounding one of said clutch-sleeves for operating the same, combined with a tripping-arm that stands normally in the path of said actuating-arm, and means for moving said tripping-arm out of the path of said actuating-arm to permit engagement of the clutch-sleeve under the action of said spring.

4. In a clutch mechanism, two rotative clutch-sleeves movable one toward and from the other and provided on their adjacent ends with interlocking clutch-teeth, a gear carried by the movable clutch-sleeve, a spring pressing the movable clutch-sleeve toward the other clutch-sleeve, a cam-sleeve surrounding and rotating with the movable clutch-sleeve and provided with oblique cam projections, similar cam projections carried by the other clutch-sleeve for engagement with the projections of the cam-sleeve, a cam-actuating arm extending radially from said cam-sleeve, combined with a tripping-arm located normally in the path of said cam-actuating arm and operating by engagement with said cam-actuating arm to spread the clutch-sleeves apart, and means for moving said tripping-arm out of the path of said cam-actuating arm.

5. In a clutch mechanism, two rotative clutch-sleeves movable one toward and from the other and provided on their adjacent ends with clutch-teeth, a spring for normally pressing one of the clutch-sleeves toward the other, the movable clutch-sleeve being provided with a gear, a sleeve surrounding one of the clutch-sleeves and rotative therewith and provided with inclined cam projections, cam projections carried by the other clutch-sleeve adapted for engagement with the projection of the cam-sleeve, a radial arm carried by the cam-sleeve, a rock-shaft and a tripping-arm carried by the rock-shaft and located normally in the path of rotation of said cam-sleeve arm, for the purpose set forth.

6. In a clutch mechanism, a rotative shaft, two clutch-sleeves, one fixed to the shaft and the other movable toward and from the fixed sleeve and rotative on the shaft, said sleeves being provided on their adjacent ends with clutch-teeth, a gear carried by the movable clutch-sleeve, a spring for throwing the movable clutch-sleeve into engagement with the fixed clutch-sleeve, a cam-ring rotatively surrounding the clutch-sleeves and provided with oblique cam projections, similar cam projections carried by one of the clutch-sleeves adapted for engagement by the projections of the cam-sleeve, an arm extending radially from said cam-sleeve, a tripping-arm located normally in the path of the arm of said cam-sleeve, and means for rocking said tripping-arm out of the path of the cam-sleeve arm to permit engagement of the clutch-sleeves under the action of said springs.

7. In a clutch mechanism, a shaft, two clutch-sleeves, one fixed to the shaft and the other movable toward and from the fixed clutch-sleeve and rotative on the shaft, said sleeves being provided on their adjacent ends with oblique clutch-teeth, a gear carried by said movable clutch-sleeve, means for throwing the movable clutch-sleeve into engagement with the fixed clutch-sleeve, a cam-ring surrounding the movable clutch-sleeve and provided with oblique cam projections, similar cam projections carried by the fixed sleeve adapted to engage the projections of the cam-sleeve, an arm extending radially from said cam-sleeve, and a tripping-arm located normally in the path of the radial arm adapted to be rocked out of said path, said cam-sleeve arm carrying an antifriction-roller.

8. In a clutch mechanism, the combination with a shaft, of a clutch-sleeve fixed thereon, a second clutch-sleeve movable toward and away from the first clutch-sleeve and rotative on said shaft, said sleeves being provided on their adjacent ends with intermeshing clutch-teeth, a gear carried by said movable clutch-sleeve, a cam-ring surrounding said movable clutch-sleeve and provided with cam projections, complemental cam projections carried by the fixed sleeve adapted for engagement with the projections of the cam-sleeve in a manner to force the movable clutch-sleeve away from the fixed clutch-sleeve when rotation of said cam-sleeve is arrested, and means for intermittently arresting the rotation of said cam-sleeve for the purpose set forth.

9. In a clutch mechanism, the combination with a shaft, of a clutch-sleeve fixed thereon, a clutch-sleeve movable toward and away from the first clutch-sleeve and rotative on said shaft and provided with clutch-teeth, complemental clutch-teeth on the fixed sleeve engaging the clutch-teeth of the movable sleeve, a gear carried by said movable clutch-sleeve, a cam-sleeve surrounding said movable clutch-sleeve and provided with cam projections, complemental cam projections on the fixed clutch-sleeve engaged by the projections of the cam-sleeve in a manner to move the movable clutch-sleeve away from the fixed clutch-sleeve when rotation of said cam-sleeve is arrested, means for intermittently arresting the rotation of said cam-sleeve, and means for limiting the rotation of said cam-sleeve to avoid separation of the cam projections thereof from the complemental cam projections of the fixed clutch-sleeve.

10. In a clutch mechanism, the combination with a shaft, of a clutch-sleeve fixed thereon, a clutch-sleeve movable toward and away from the first clutch-sleeve and rotative on said shaft and provided with clutch-teeth, complemental clutch-teeth on the fixed sleeve engaging the clutch-teeth of the movable sleeve, a gear carried by said movable clutch-sleeve, a cam-sleeve surrounding said movable clutch-sleeve and provided with cam projections, complemental cam projections on the fixed clutch-sleeve engaged by the projections of the cam-sleeve in a manner to move the movable clutch-sleeve away from the fixed clutch-sleeve when rotation of said cam-sleeve is arrested, means for intermittently arresting the rotation of said cam-sleeve, and means preventing separation of said cam projections, comprising a ring surrounding the interlocking parts of the cam projections and provided at one side with a recess, and ribs carried, one by said fixed sleeve and the other by said cam-ring, and located in said recess.

In testimony that I claim the foregoing as my invention I affix my signature, in presence of two witnesses, this 28th day of September, A. D. 1905.

WILLIAM F. JACOBS.

Witnesses:
M. B. SHAW,
B. S. JORDAN.